(12) United States Patent
Hamilton et al.

(10) Patent No.: US 10,935,344 B2
(45) Date of Patent: Mar. 2, 2021

(54) RETICLE FOR AN OPTICAL SIGHTING DEVICE TO ENGAGE TARGETS FROM MULTIPLE RANGES

(71) Applicant: Sheltered Wings, Inc., Barneveld, WI (US)

(72) Inventors: David M. Hamilton, Middleton, WI (US); Michael Rosen, Middleton, WI (US)

(73) Assignee: Sheltered Wings, Inc., Barneveld, WI (US)

( * ) Notice: Subject to any disclaimer, the term of this patent is extended or adjusted under 35 U.S.C. 154(b) by 0 days.

(21) Appl. No.: 16/315,685

(22) PCT Filed: Jul. 7, 2017

(86) PCT No.: PCT/US2017/041128
§ 371 (c)(1),
(2) Date: Jan. 7, 2019

(87) PCT Pub. No.: WO2018/009819
PCT Pub. Date: Jan. 11, 2018

(65) Prior Publication Data
US 2019/0301834 A1    Oct. 3, 2019

Related U.S. Application Data

(60) Provisional application No. 62/359,550, filed on Jul. 7, 2016.

(51) Int. Cl.
| F41G 1/38 | (2006.01) |
| F41G 1/30 | (2006.01) |
| G02B 27/32 | (2006.01) |
| F41G 3/06 | (2006.01) |

(52) U.S. Cl.
CPC ............... *F41G 1/30* (2013.01); *G02B 27/32* (2013.01); *F41G 3/06* (2013.01)

(58) Field of Classification Search
CPC ... F41G 1/30; F41G 3/06; F41G 1/473; G02B 27/32
USPC .................................................... 42/111–123
See application file for complete search history.

(56) References Cited

U.S. PATENT DOCUMENTS

| 2,420,252 | A | 5/1947 | Land |
| 5,920,995 | A | 7/1999 | Sammut |
| 6,032,374 | A | 3/2000 | Sammut |
| D456,057 | S | 4/2002 | Smith, III |

(Continued)

FOREIGN PATENT DOCUMENTS

EP    1965166 A1    9/2008

OTHER PUBLICATIONS

Trijicon, May 2, 2013 https://twobirdsflyingpub.wordpress.com/2013/05/02/trijicon-adds-vcog-to-its-line-of-magnified-optics/ (Year: 2013).*

(Continued)

*Primary Examiner* — Michael D David
(74) *Attorney, Agent, or Firm* — Husch Blackwell LLP (57) ABSTRACT

Rangefinding methods are described herein, and more particularly to shapes superimposed on an image that enable measurement of distances with a sighting device. A reticle for an optical sight, including but not limited to a holographic sight, which allows the user to near instantaneously engage targets from multiple ranges, is described herein.

13 Claims, 3 Drawing Sheets

(56) References Cited

U.S. PATENT DOCUMENTS

| | | | |
|---|---|---|---|
| 6,453,595 B1 | 9/2002 | Sammut | |
| 6,516,551 B2 | 2/2003 | Gaber | |
| 6,516,699 B2 | 2/2003 | Sammut et al. | |
| 6,614,975 B2 | 9/2003 | Richardson et al. | |
| 6,681,512 B2 | 1/2004 | Sammut | |
| 7,185,455 B2 * | 3/2007 | Zaderey | F41G 1/38 42/122 |
| D567,324 S | 4/2008 | Pride et al. | |
| D567,325 S | 4/2008 | Pride et al. | |
| D567,326 S | 4/2008 | Pride et al. | |
| 7,712,225 B2 | 5/2010 | Sammut | |
| 7,738,082 B1 * | 6/2010 | Peters | G01C 3/22 356/4.01 |
| 7,832,137 B2 | 11/2010 | Sammut et al. | |
| 7,856,750 B2 | 12/2010 | Sammut et al. | |
| D631,125 S | 1/2011 | Huber | |
| 7,937,878 B2 | 5/2011 | Sammut et al. | |
| 7,946,048 B1 | 5/2011 | Sammut | |
| D654,136 S | 2/2012 | Huber | |
| 8,109,029 B1 | 2/2012 | Sammut et al. | |
| 8,230,635 B2 | 7/2012 | Sammut et al. | |
| 8,353,454 B2 | 1/2013 | Sammut et al. | |
| 8,464,451 B2 * | 6/2013 | McRae | F41A 17/06 42/1.01 |
| 8,656,630 B2 | 2/2014 | Sammut | |
| D700,944 S | 3/2014 | Mikroulis | |
| D700,945 S | 3/2014 | Mikroulis | |
| 8,707,608 B2 | 4/2014 | Sammut et al. | |
| D715,394 S | 10/2014 | Young | |
| D715,395 S | 10/2014 | Young et al. | |
| 8,893,971 B1 | 11/2014 | Sammut et al. | |
| 8,905,307 B2 | 12/2014 | Sammut et al. | |
| D722,360 S | 2/2015 | Pride | |
| 8,959,824 B2 | 2/2015 | Sammut et al. | |
| 8,966,806 B2 | 3/2015 | Sammut et al. | |
| 8,991,702 B1 | 3/2015 | Sammut et al. | |
| D726,280 S | 4/2015 | Mikroulis | |
| 9,068,794 B1 | 6/2015 | Sammut | |
| D741,445 S | 10/2015 | Pride | |
| D745,105 S | 12/2015 | Mikroulis | |
| D745,168 S | 12/2015 | White et al. | |
| D749,688 S | 2/2016 | Harris | |
| 9,250,038 B2 | 2/2016 | Sammut et al. | |
| 9,255,771 B2 | 2/2016 | Sammut et al. | |
| 9,335,123 B2 | 5/2016 | Sammut | |
| D758,523 S | 6/2016 | Mikroulis | |
| D767,077 S | 9/2016 | Mikroulis | |
| D767,659 S | 9/2016 | Mikroulis | |
| D767,660 S | 9/2016 | Mikroulis | |
| D767,661 S | 9/2016 | Mikroulis | |
| 9,459,077 B2 | 10/2016 | Sammut et al. | |
| 9,500,444 B2 | 11/2016 | Sammut et al. | |
| 9,574,850 B2 | 2/2017 | Sammut et al. | |
| D781,989 S | 3/2017 | Pride | |
| D783,113 S | 4/2017 | Noller et al. | |
| D783,114 S | 4/2017 | Noller et al. | |
| D783,115 S | 4/2017 | Noller et al. | |
| D783,763 S | 4/2017 | Pride | |
| 9,612,086 B2 | 4/2017 | Sammut et al. | |
| D802,702 S | 11/2017 | Zhang | |
| D803,973 S | 11/2017 | Kedairy | |
| D805,156 S | 12/2017 | Noller et al. | |
| 9,869,530 B2 | 1/2018 | Sammut et al. | |
| 10,060,703 B2 | 8/2018 | Sammut et al. | |
| 10,254,082 B2 | 4/2019 | Sammut et al. | |
| 10,295,307 B2 | 5/2019 | Sammut et al. | |
| 2004/0047586 A1 * | 3/2004 | Schick | F41G 1/30 385/147 |
| 2006/0168871 A1 * | 8/2006 | Wagner | F41G 1/38 42/122 |
| 2007/0044364 A1 * | 3/2007 | Sammut | F41G 1/38 42/122 |
| 2007/0097351 A1 | 5/2007 | York et al. | |
| 2008/0098640 A1 * | 5/2008 | Sammut | F41G 3/06 42/122 |
| 2009/0235570 A1 * | 9/2009 | Sammut | F41G 1/473 42/122 |
| 2011/0132983 A1 * | 6/2011 | Sammut | F41G 1/00 235/404 |
| 2012/0137567 A1 * | 6/2012 | Sammut | F41G 1/38 42/130 |
| 2012/0298750 A1 | 11/2012 | McCarty et al. | |
| 2014/0007486 A1 * | 1/2014 | Hornung | F41G 1/345 42/123 |
| 2014/0059915 A1 * | 3/2014 | Sammut | F41G 1/38 42/122 |
| 2014/0166751 A1 * | 6/2014 | Sammut | F41G 1/38 235/404 |
| 2015/0362288 A1 * | 12/2015 | Sammut | F41G 3/12 235/404 |
| 2016/0231083 A1 * | 8/2016 | Regan | F41G 1/30 |
| 2016/0252325 A1 * | 9/2016 | Sammut | F41G 1/38 42/122 |
| 2020/0072576 A1 * | 3/2020 | Gallery | F41G 3/08 |

OTHER PUBLICATIONS

Dave Dolbee, Nov. 18, 2012 https://blog.cheaperthandirt.com/clear-choices-ar-optics/ (Year: 2012).*

European Search Report for European Patent Application No. 17824991.8 dated Feb. 10, 2020, 5 pages.

International Search Report and Written Opinion for International Application No. PCT/US2017/041128 dated Sep. 29, 2017. 15 pages.

"Trijicon® Adds VCOG™ to Its Line of Magnified Optics", May 2, 2013. 3 pages. https://twobirdsflyingpub.wordpress.com/2013/05/02/trijicon-adds-vcog-to-its-line-of-magnified-optics/.

Dolbee, Dave "Awesome Optics for ARs" published on Nov. 18, 2012 in Gun Gear. 9 pages. https://blog.cheaperthandirt.com/clear-choices-ar-optics/.

* cited by examiner

RETICLE FOR AN OPTICAL SIGHTING DEVICE TO ENGAGE TARGETS FROM MULTIPLE RANGES

CROSS REFERENCE TO RELATED APPLICATIONS

This application claims priority to U.S. Provisional Patent Application No. 62/359,550 filed Jul. 7, 2016, which is incorporated herein by reference in its entirety.

FIELD

The disclosure relates to rangefinding, and more particularly to shapes superimposed on an image that enable measurement of distances with a sighting device.

BACKGROUND

Reticles are used in sighting devices for aiming and for measuring distances or sizes of objects. There have been a number of advances in reticle design over the past ten years, but none of these advances has fully resolved all of the problems or limitations in certain types of shooting.

A reticle is a shape superimposed on an image that is used for precise alignment of a device, most notably that of a telescopic sight. The minimum reticle consists of simple crossed lines, or crosshairs, that meet at the optical center of the device.

By using a reticle with marks of a known angular spacing, the principle of similar triangles can be used to find either the distance to objects of known size or the size of objects at a known distance. In either case, a known parameter is used, in conjunction with the angular measurement, to derive the length of the other side.

Telescopic sights for firearms, most commonly referred to as scopes, are the devices most often associated with crosshairs. A number of patents have been granted for rangefinding reticles for scopes. Crosshairs are commonly associated with telescopic sights for aiming firearms and are also common in optical instruments used for astronomy and surveying.

However, there are limitations with current sights. With a telescopic sight, the users' eye must be exactly in line with the center of the sight tube, and at the correct distance (eye relief) or there will be no sight picture—an issue that gets more critical with increased magnification. In addition, getting on target can take a significant amount of time. This problem is less severe when using Intermediate Eye Relief (I.E.R.) or Extended Eye Relief (E.E.R.) scopes.

Telescopic sights do solve the issue of focus—the aiming reticle will appear on the same focal plane as the target, so both are in focus at the same time. With magnification however, the user is typically aiming with one eye closed, which can reduce awareness of the surroundings, and limit the field of view through the scope.

With either a reflex sight or a holographic sight, the user does not have to align the eye with the sight tube, or sight axis, and eye relief is no longer an issue. The user can be looking through the sight from a position that would be useless for iron sights, or for a telescope, and still you can use the aiming reticle successfully. The user no longer needs to focus with one eye on a front sight while the target appears out of focus.

Unlike a telescope sight, an electronic sight, such as a holographic sight, allow the shooter to pay full attention to the target area using both eyes, while the aiming reticle is suspended within the full, natural field of view. For a multitude of reasons, including but not limited to (1) reticle in focus with the target, (2) no need for perfect eye-to-weapon alignment, and (3) retention of full field of view, electronic sights are faster on target and are often said to allow for improved "situational awareness."

In addition, holographic sights provide an advantage because they have a much larger sight picture (field of view) within the sight window, and they also allow a full reticle pattern instead of just a dot. Having a full reticle pattern allows useful features to be created for various situations.

Thus, a reticle was created that is useful at multiple ranges for modern sporting rifles and military style rifles, including but not limited to AR-15 and M4 carbine.

SUMMARY

In one embodiment, the disclosure provides an optical sight having a focal plane and a reticle positioned within the focal plane. In another embodiment, the disclosure provides a reticle for an optical sight. In yet another embodiment, the disclosure provides a reticle for an electronic sight. In one embodiment, the reticle is for a holographic sight.

In one embodiment, the disclosure relates to a reticle comprising a circle with a gap in each quadrant of the circle, a first aiming point in the inner portion of the circle, and a second aiming point located at the bottom of the circle.

In one embodiment, the disclosure relates to a reticle comprising a circle with a first gap in the first quadrant of the circle, a second gap in the second quadrant of the circle, a third gap in the third quadrant of the circle, and a fourth gap in the fourth quadrant of the circle and multiple aiming points. In one embodiment, the reticle has at least two aiming points. In another embodiment, the reticle has 1, 2, 3, 4, 5, 6, 7, 8, 9, 10, or greater than 10 aiming points.

In one embodiment, the disclosure relates to a reticle comprising a circle with a first gap in the first quadrant of the circle, a second gap in the second quadrant of the circle, a third gap in the third quadrant of the circle, and a fourth gap in the fourth quadrant of the circle and 4 aiming points. In one embodiment, one aiming point is located at 12 o'clock, a second aiming point is located at 3 o'clock, a third aiming point is located at 6 o'clock, and a fourth aiming point is located at 9 o'clock. In another embodiment, a fifth aiming features is located in the inner portion of the reticle. In another embodiment, the fifth aiming feature is located in the center field of view.

In another embodiment, the disclosure relates to a reticle comprising a circle having a top portion, a left portion, a right portion, and a bottom portion, wherein the bottom portion is an aiming point, wherein the circle has a first gap located between the right portion and the top portion, a second gap located between the top portion and left portion, a third gap located between the left portion and the bottom portion, and a fourth gap located between the bottom portion and the right portion. In one embodiment, the portions are filled lines.

In still another embodiment, the disclosure relates to a reticle comprising a circle with a gap in a first quadrant, a second quadrant, a third quadrant, and a fourth quadrant of the circle, a first aiming point in the inner portion of the circle, and a second aiming point located at the bottom of the circle, wherein at least two gaps are of equal length. In one embodiment, the gap in the first and second quadrants is of the same length. In another embodiment, the gap in the third and fourth quadrants is of the same length.

In another embodiment, the disclosure relates to a reticle comprising a circle having a top portion, a left portion, a right portion, and a bottom portion, wherein the bottom portion is an aiming point, wherein the circle has a first gap located between the right portion and the top portion, a second gap located between the top portion and left portion, a third gap located between the left portion and the bottom portion, and a fourth gap located between the bottom portion and the right portion, wherein at least two of the four gaps are of equal length.

In still another embodiment, the disclosure relates to a reticle comprising a circle with a gap in each quadrant of the circle, a first aiming point in the inner portion of the circle, and a second aiming point located at the bottom of the circle, wherein at least two gaps are of equal length.

In yet another embodiment, the disclosure relates to a reticle comprising a circle with a gap in each quadrant of the circle, a first aiming point in the inner portion of the circle, and a second aiming point located at the bottom of the circle, wherein the first aiming point is used for long/medium range targets and the second aiming point is used for close range targets. In one embodiment, a close range target includes but is not limited to a target at less than 25 yards, less than 20 yards, less than 15 yards, less than 14 yards, less than 13 yards, less than 12 yards, less than 11 yards, less than 10 yards, less than 9 yards, less than 8 yards, less than 7 yards, less than 6 yards, less than 5 yards, less than 4 yards, less than 3 yards, less than 2 yards, and less than 1 yard.

In still another embodiment, a reticle comprising a circle with at least two gaps in two or more quadrants of the circle, a first aiming point in the inner portion of the circle, and a second aiming point located at the bottom of the circle, wherein at least two gaps are of equal length.

In another embodiment, a reticle comprising a circle having a top portion, a left portion, a right portion, and a bottom portion, wherein the circle has a first gap located between the right portion and the top portion, a second gap located between the top portion and left portion, a third gap located between the left portion and the bottom portion, and a fourth gap located between the bottom portion and the right portion, wherein at least two of the four gaps are of equal length. In one embodiment, an aiming point or marker is the bottom portion.

In one embodiment, the reticle is for an optical sight, including but not limited to a holographic sight, which allows the user to near instantaneously engage targets from multiple ranges. In one embodiment, the user can engage a target at ranges from 0 yards to 600 yards. In another embodiment, the reticle pattern is effective for engaging targets at many distances especially for fleeing very close targets such as might be engaged by law enforcement, military, or home defense in "close quarters combat" situations.

In one embodiment, the reticle can be used in a holographic sight at 1× magnification.

In one embodiment, the reticle is circular in shape or design. In another embodiment, the reticle is a discontinuous circle. In still another embodiment, the reticle is a circle with at least one gap in one or more quadrants of the circle. In yet another embodiment, the reticle is a circle with two or more gaps.

In another embodiment, the reticle has an outer 65 Minute of Angle ("MOA") circle. In one embodiment, the outer 65 MOA circle has gaps. In another embodiment, the outer 65 MOA circle is fragmented or broken. In another embodiment, the reticle is circular with a gap in at least one quadrant of the circle.

In one embodiment, the aiming point or marker is a shape selected from the group consisting of: a triangle, a dot, a filled dot, an open dot, a hexagon, a rectangle, a square, an octagon, a number, a letter, or any suitable shape. In one embodiment, any marker can be used at the bottom of the circle provided it is prominent in relation to the rest of the pattern.

In still another embodiment, the marker at the bottom of the circle can be superimposed over "close quarter targets," including but not limited to less than about 12 yards, for these shots to be more accurate.

In another embodiment, the reticle pattern has a small marker at the bottom of the circle. In one embodiment, any marker can be used at the bottom of the circle provided it is easy to acquire.

In another embodiment, the reticle pattern has an aiming point at the bottom of the circle. In one embodiment, any aiming point can be used at the bottom of the circle provided it is easy to acquire. In another embodiment, there is a top line distally extending from the outer circle of the reticle pattern.

In another embodiment, a right line distally extends from the outer circle of the reticle.

In another embodiment, a right horizontal line extends from the outer circle of the reticle. In another embodiment, the right horizontal line does not extend into the inner portion of the circle.

In another embodiment, a left line distally extends from the outer circle of the reticle.

In another embodiment, a left horizontal line extends from the outer circle of the reticle. In another embodiment, the left horizontal line does not extend into the inner portion of the circle.

In another embodiment, a right line distally extends from the right portion of the reticle.

In another embodiment, a right horizontal line extends from the right portion of the reticle. In another embodiment, the right horizontal line does not extend into the inner portion of the circle.

In another embodiment, a left line distally extends from the left portion of the reticle.

In another embodiment, a left horizontal line extends from the left portion of the reticle. In another embodiment, the left horizontal line does not extend into the inner portion of the circle.

An advantage of the reticle pattern, optical sight, and firearms disclosed herein is the ability to shoot targets at different distances very quickly.

An advantage of the reticle pattern, optical sight, and firearms disclosed herein is the ability to shoot targets at different distances with minimal manipulation of the sight.

An advantage of the reticle pattern, optical sight, and firearms disclosed herein is the ability to shoot targets at different distances without excess manipulation of the sight.

An advantage of the reticle patter, optical sight, and firearms disclosed herein is the ability to shoot targets at close range, medium range, and long range distances.

DETAILED DESCRIPTION

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, distances from a user of a device to a target.

The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, an "electronic sight" encompasses reflex sights, holographic sights, and laser sights.

As used herein, a "firearm" is a portable gun, being a barreled weapon that launches one or more projectiles often driven by the action of an explosive force. As used herein, the term "firearm" includes a handgun, a long gun, a rifle, shotgun, a carbine, automatic weapons, semi-automatic weapons, a machine gun, a sub-machine gun, an automatic rifle, and an assault rifle.

As used herein, a "holographic sight," or a "holographic weapon sight," or a "holographic diffraction sight" is a non-magnifying gun sight that allows the user to look through a glass optical window and see a reticle image superimposed at a distance on the field of view. The hologram of the reticle is built into the window and is illuminated by a laser diode. The terms a "holographic weapon sight," a "holographic diffraction sight," a "holosight," a "holographic sight" are used interchangeably.

As used herein, a "laser sight" is a laser pointer designed to tolerate firearm recoil, and having windage and elevation adjustments for zeroing the laser with the firearm. The laser light needs to make the round trip from the firearm, to the target, and back, and still be visible to the shooter. The visibility of the laser dot is therefore affected by distance, tremendously affected by the reflectivity of the target, by the brightness of the daylight, and by atmospheric conditions like fog, rain, snow, dust, and smoke. A laser sight therefore needs a lot of power compared to a reflex sight or holographic sight.

As used herein, a "quadrant" of an object is one-fourth of the object. When a circle is evenly divided into four sections by two perpendicular lines, each of the four areas is a quadrant. The two perpendicular lines may be visible or invisible. The two perpendicular lines usually intersect at the center of the object.

As used herein, a "reflex sight" encompasses a sight wherein the aiming reticle (the dot, triangle, chevron, circle, etc.) is projected forward, from a point behind the objective lens, and is then reflected off the back of the objective lens assembly toward the shooter's eye. The objective lens is therefore a partial mirror, which also means that it will not allow as much light to pass through it as would a regular lens, such as with a regular telescope. Most "red dot" type sights fall into this category.

As used herein, the term "target acquisition device" refers to an apparatus used by the shooter to select, identify or monitor a target. The target acquisition device may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the target acquisition device may be unaltered, or it may be enhanced, for example, by magnification, amplification, subtraction, superimposition, filtration, stabilization, template matching, or other means finding use in the disclosure. The target selected, identified or monitored by the target acquisition device may be within the line of sight of the shooter, or tangential to the sight of the shooter, or the shooter's line of sight may be obstructed while the target acquisition device presents a focused image of the target to the shooter. The image of the target acquired by the target acquisition device may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method.

In one embodiment, an optical sight having a reticle is disclosed. In one embodiment, the optical sight is an electronic sight. In one embodiment, the electronic sight is a holographic sight.

With a holographic sight, a reticle is superimposed on the view of the target field by way of a laser transmission hologram. Essentially a photograph of the reticle is taken using a very careful application of laser light. The hologram, sandwiched in glass, forms a window through which the user views the target. Since there is no reflective coating, a holographic sight will not alter the normal light going through its sighting window. The laser beam is spread out by a lens and shone backward, toward the shooter, from a position in front of the hologram window.

In one embodiment, the reticle is a discontinuous circle with a dot or marker in the center of the field of view, and four quadrants with a gap in each quadrant. In one embodiment, the dot can be a filled dot or unfilled dot.

In yet another embodiment, the reticle pattern is a discontinuous circle with a bullseye in the center of the field of view, and four quadrants with a gap in each quadrant. In one embodiment, the bullseye can be any shape provided the shape is easy to acquire. In one embodiment, the bullseye is a circle, a square, a star, a rectangle, an octagon, a hexagon, a letter, a number, a star or any other desired shape.

Figure 1A:
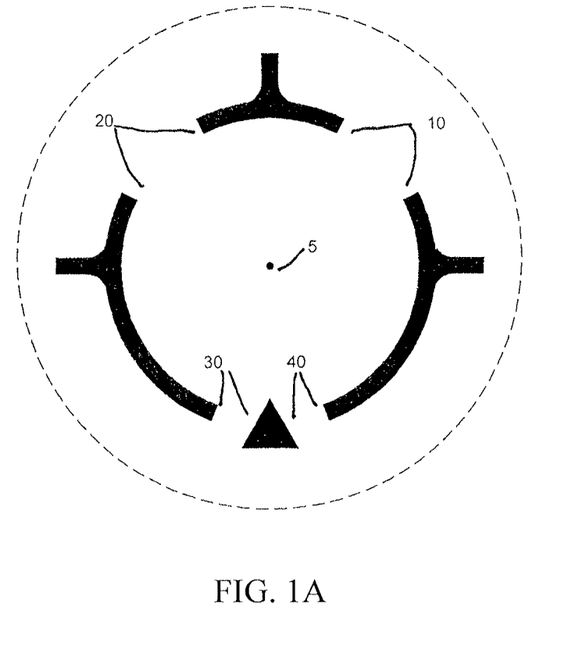
FIG. 1A and FIG. 1B are front views of a first embodiment of a reticle pattern for an optical sight.
Figure 1B:
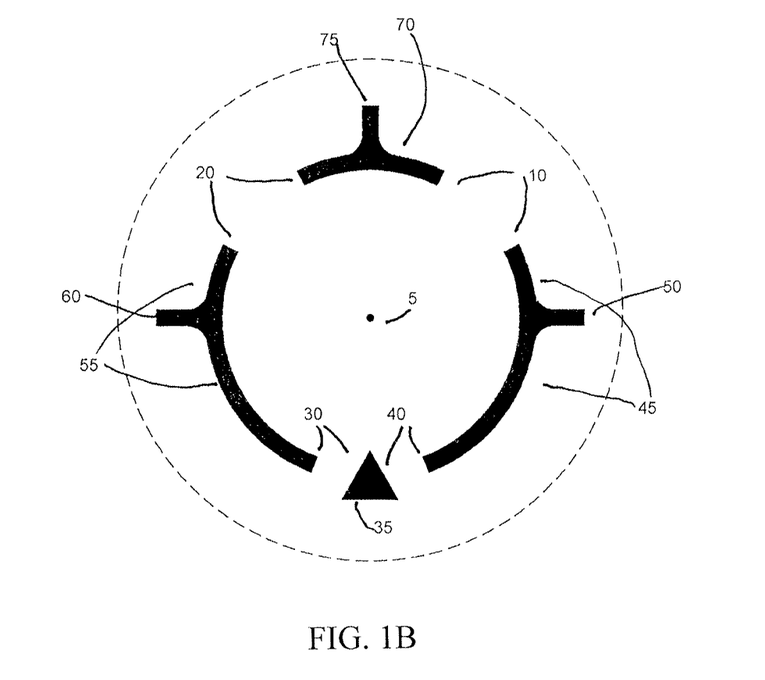
Figure 2:
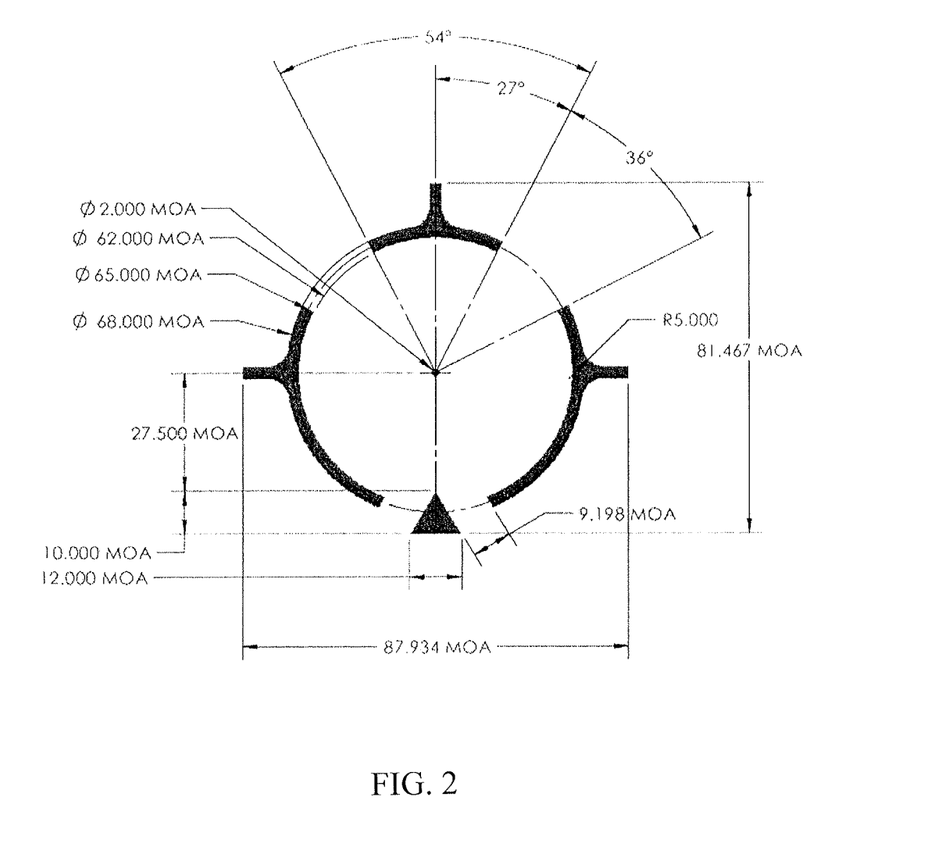
FIG. 2 is a front view of a first embodiment of a reticle pattern showing the markings as viewed through an optical sight, the spacing of the markings based upon a user's minute of angle.

In yet another embodiment, the reticle is a discontinuous circle with a dot or bullseye in the center of the field of view, four quadrants with a gap in each quadrant, and an aiming point. In one embodiment, one aiming point is a marker located at the bottom of the circle. In a non-limiting manner, the triangle in FIGS. 1A, 1B, and 2 is an example of an aiming point located at the bottom of the circle. In one embodiment, the aiming point at the bottom of the circle is for a close range targets.

In one embodiment, the aiming point can be any desired shape or size provided it is easy to acquire. In one embodiment, the aiming point is a triangle, a circle, a square, a star, a flag, a rectangle, an octagon, a hexagon, a letter, a number or any other desired shape or marker.

In one embodiment, the reticle is a discontinuous circle with a dot or bullseye in the center of the field of view, four quadrants with a gap in each quadrant of the circle, an aiming point, and a discontinuous horizontal line, with no horizontal line in the inner portion of the circle. In one embodiment, the discontinuous horizontal line aligns with the center of the field of view.

In one embodiment, the reticle pattern is a discontinuous circle with a dot or bullseye in the center of the field of view, four quadrants with a gap in each quadrant of the circle, an aiming point, and a short horizontal line extending from the outer portion of the circle and aligned with the bullseye or dot. In one embodiment, the short horizontal line extends outward from at least the right side of the circle. In yet another embodiment, the short horizontal line extends outward from at least the left side of the circle.

In one embodiment, the reticle pattern is a discontinuous circle with a dot or bullseye in the center of the field of view, four quadrants with a gap in each quadrant of the circle, an aiming point, a discontinuous horizontal line, with no horizontal line in the inner portion of the circle, and a vertical line extending from the outer top portion of the circle. In one embodiment, the vertical line does not extend to the inner portion of the circle. In still another embodiment, the vertical line aligns with the center of the field of view. In yet another embodiment, the vertical line aligns with the bullseye or dot. In still another embodiment, a vertical line does not extend from the bottom portion of the circle.

FIG. 1A illustrates a representative embodiment of the disclosure. The representative reticle comprises a discontinuous circle with a dot or bullseye 5 located in the center field of view. A first gap 10 exists in the first quadrant of the circle or between the right portion and top portion of the circle. A second gap 20 exits in the second quadrant of the circle or between the top portion and left portion of the circle. A third gap 30 exists in the third quadrant of the circle or between the left portion and the bottom portion of the circle. A fourth gap exists in the fourth quadrant of the circle or between the bottom portion and the right portion of the circle.

In one embodiment, the gaps of the first and second quadrants (10, 20) are of the same length. In another embodiment, the gaps of the third and fourth quadrants (30, 40) are of the same length. In still another embodiment, the gaps of two or more quadrants can be the same length. In yet another embodiment, the gaps of all four quadrants are of the same length. In still another embodiment, the gaps of all four quadrants are of a different length.

FIG. 1B illustrates another representative embodiment of a reticle of the disclosure. An aiming point 35 is located at the bottom of the circle. The right portion of the circle 45 has a horizontal line 50 extending outward. The left portion of the circle 55 has a horizontal line 60 extending outward. In one embodiment, horizontal line 50 and 60 are aligned with the central field of view but no horizontal line is present in the inner portion of the circle. In one embodiment, the inner portion of the circle contains the dot or bullseye 5.

The top portion of the circle 70 contains a vertical line 75 extending outward from the circle. In one embodiment, the vertical line 75 does not extend into the inner circle. In one embodiment, the vertical line 75 aligns with the center field of view. In still another embodiment, the bottom portion of the circle does not have a vertical line extending therefrom.

FIG. 2 illustrates a current embodiment of a reticle of the disclosure. In one embodiment, the reticle is circular in shape with four additional aiming features located at the 12 o'clock, 3 o'clock, 6 o'clock, and 9 o'clock positions. Symmetry about both x and y axes allows for the reticle to be divided into four equally-spaced quadrants for reference. The quadrants can be numbered the same way a traditional rectangular coordinate system is numbered.

Starting on the y-axis between quadrants 1 and 2, is a 54° angle that designates the angle the top reticle portion makes between where it begins and ends. Since there is also a 27° angle from the y-axis to where the top reticle portion ends, it is symmetric about the y-axis. Moving into quadrant 1, a 36° angle exists between the end of the top reticle portion and the beginning of the right reticle portion. Finally, a corner radius of 5 MOA (minute of angle) smoothly transitions to the right hand aiming feature. This corner radius exists on all aiming features (×6). The 54° and 27° angles also exist on the bottom portion of the reticle (between quadrants 3 and 4). The 36° angle is the same for the gap that occurs in quadrant 2.

As shown in FIG. 2, there are several diameters listed in quadrant 2. The first can be referred to as the "bullseye" diameter, which is listed as 2 MOA. The next is the inner diameter, which is 62 MOA, followed by a middle diameter of 65 MOA, and finally an outer diameter of 68 MOA.

In quadrant 3, the distance from the center of the reticle down to the tip of the lower triangle is 27.5 MOA. The triangle has a height of 10 MOA and a base width of 12 MOA. Stretching from quadrant 3 to quadrant 4 is the total x-axis width of the reticle, which is 87.934 MOA.

In quadrant 4, the gap distance between the triangle and right hand reticle portion is 9.198 MOA. The total y-axis height of the reticle is 81.467 MOA.

As can be observed in FIG. 2, the outer 65 MOA circle has gaps, and is broken, allowing the eye to be drawn into the center of the reticle and the target without covering up as much of the field of view since the circle has gaps.

FIG. 2 depicts a small marker at the bottom of the outer 65 MOA "broken circle." This "marker" is prominent, intuitive, and easy to acquire. This allows the user to put the marker over "close range targets" in order for these shots to be more accurate.

In one embodiment, "close range targets" include but are not limited to target at 1, 2, 3, 4, 5, 6, 7, 8, 9, 10, 11, and 12 yards. In one embodiment, "close range targets" include but are not limited to less than 12 yards, less than 10 yards, less than 8 yards, less than 6 yards, less than 4 yards, and less than 2 yards.

FIG. 2 depicts the top, right, and left lines distally extending from the outer 65 MOA broken circle, which help to level your shooter apparatus to the target when shooting.

An aiming point at the bottom of the reticle provides a good visual pick-up to a shooters eye, so for close/high threat targets, it is a perfect aiming point that is quickly acquired. For a target at a distance ranging from 25-300/50-180 the center aiming dot is the perfect zero.

In one embodiment, medium/long range distances include but are not limited to 25-300 yards, 25-200 yards, 25-150 yards, 25-100 yards, and 25-50 yards.

In one embodiment, medium/long range distances include but are not limited to 25-350 yards, 50-300 yards, 100-300 yards, 150-300 yards, 200-300 yards and 250-300 yards.

In one embodiment, the disclosure relates to a firearm comprising an optical sight having a focal plane and a reticle positioned within the focal plane, wherein the reticle has a circular pattern with gaps and two aiming points. In one embodiment, the firearm is an AR-10, or an AR-15 civilian or M4 military style rifle.

In one embodiment, the firearm can be used to shot any suitable bullet including but not limited to M193, 55 grain (common for civilian use, competition shooting, and very small game such as varmints (gophers, rabbits, and coyote)), M855, 62 grain bullets (widely used bullet for military because it is NATO approved), MK262, 77 grain bullets (mainly used by special operation teams), and .308 bullets.

In one embodiment, the disclosure relates to a holographic sight or firearm comprising an optical sight, wherein the holographic sight/optical sight has a focal plane and a reticle positioned in the focal plane, wherein the reticle allows the user to shoot targets at different distances.

In one embodiment, the disclosure relates to a holographic sight or firearm comprising an optical sight, wherein the holographic sight/optical sight has a focal plane and a reticle positioned in the focal plane, wherein the reticle is a circle with a gap in at least one quadrant of the circle and multiple aiming points.

In one embodiment, the disclosure relates to a holographic sight or firearm comprising an optical sight, wherein the holographic sight/optical sight has a focal plane, a reticle pattern positioned in the focal plane, wherein the reticle pattern is a circle with a gap in at least the first quadrant of the circle and multiple aiming points.

In one embodiment, the disclosure relates to a holographic sight or firearm comprising an optical sight, wherein the holographic sight/optical sight has a focal plane, a reticle pattern positioned in the focal plane, wherein the reticle pattern is a circle with a gap in at least one quadrant of the circle and multiple aiming points. In one embodiment, the reticle has a gap in each of the first, second, third, and fourth quadrants of the circle.

In one embodiment, the disclosure relates to a holographic sight or firearm comprising an optical sight, wherein the holographic sight/optical sight has a focal plane, a reticle pattern positioned in the focal plane, wherein the reticle pattern is a circle with a gap in at least the second quadrant of the circle and multiple aiming points.

In one embodiment, the disclosure relates to a holographic sight or firearm comprising an optical sight, wherein the holographic sight/optical sight has a focal plane, a reticle pattern positioned in the focal plane, wherein the reticle pattern is a circle with a gap in at least the third quadrant of the circle and multiple aiming points.

In one embodiment, the disclosure relates to a holographic sight or firearm comprising an holographic sight/optical sight, wherein the holographic sight/optical sight has a focal plane, a reticle pattern positioned in the focal plane, wherein the reticle pattern is a circle with a gap in at least the fourth quadrant of the circle and multiple aiming points.

In one embodiment, the disclosure relates to a holographic sight or firearm comprising a holographic sight/optical sight having a focal plane and a reticle positioned within the focal plane, wherein the reticle pattern allows a user to shoot targets at multiple distances with minimal manipulation of the optical sight as compared to the manipulation necessary for a standard reticle.

In still another embodiment, the disclosure relates to a target acquisition device, comprising: a) a housing mounted in a fixed, predetermined position relative to a firearm; b) an objective lens mounted in one end of said housing; c) an ocular lens mounted in the opposite end of said housing; and d) a reticle as described above.

In still another embodiment, the disclosure relates to a target acquisition device, comprising: a) a housing mounted in a fixed, predetermined position relative to a firearm; b) an objective lens mounted in one end of said housing; c) an ocular lens mounted in the opposite end of said housing; and d) a reticle comprising a circle with a gap in each quadrant of the circle, a first aiming point in the inner portion of the circle, and a second aiming point located at the bottom of the circle.

In still another embodiment, the disclosure relates to a target acquisition device, comprising: a) a housing mounted in a fixed, predetermined position relative to a firearm; b) an objective lens mounted in one end of said housing; c) an ocular lens mounted in the opposite end of said housing; and d) a reticle comprising a circle having a top portion, a left portion, a right portion, and a bottom portion, wherein the bottom portion is an aiming point, wherein the circle has a first gap located between the right portion and the top portion, a second gap located between the top portion and left portion, a third gap located between the left portion and the bottom portion, and a fourth gap located between the bottom portion and the right portion.

In still another embodiment, the disclosure relates to a target acquisition device, comprising: a) a housing mounted in a fixed, predetermined position relative to a firearm; b) an objective lens mounted in one end of said housing; c) an ocular lens mounted in the opposite end of said housing; and d) a reticle comprising a circle with a gap in each quadrant of the circle, a first aiming point in the inner portion of the circle, and a second aiming point located at the bottom of the circle, wherein at least two gaps are of equal length.

In still another embodiment, the disclosure relates to a target acquisition device, comprising: a) a housing mounted in a fixed, predetermined position relative to a firearm; b) an objective lens mounted in one end of said housing; c) an ocular lens mounted in the opposite end of said housing; and d) a reticle comprising a circle having a top portion, a left portion, a right portion, and a bottom portion, wherein the bottom portion is an aiming point, wherein the circle has a first gap located between the right portion and the top portion, a second gap located between the top portion and left portion, a third gap located between the left portion and the bottom portion, and a fourth gap located between the bottom portion and the right portion, wherein at least two of the four gaps are of equal length.

Embodiments of the disclosure can be further defined by reference to the following non-limiting examples. It will be apparent to those skilled in the art that many modifications, both to materials and methods, may be practiced without departing from the scope of the present disclosure.

Example 1

Table 1 lists shooting parameters for a 0.224 cal 55 grains bullet and the environmental conditions. Table 2 is a drop chart for the 0.224 cal 55 grains bullet. When zeroed at 50 yards for a 55 grain bullet, there is a second zero at about 180 yards. However, at roughly 7 yards, the user begins to hit low by close to 2 inches. At about 7 yards, the user is hitting low in angular measurement of about 27.5 MOA, which corresponds to the top of an aiming point located at the bottom of the circle. Therefore, the user can rely on the aiming point at the bottom of the circle for "close targets" and a second aiming point in the center for all targets around 25-300/50-180 yards (depending on the zero range).

The angular units change significantly between 7 yards and 0 yards, however, in inches, the change is negligible, so it is not necessary to have numerous different hold points for 7, 6, 5, 4, 3, 2, 1, and 0 yards. One aiming point at the bottom of the reticle pattern (a circle in FIG. 1) is sufficient.

TABLE 1

Shooting parameters for 0.224 cal 55 grains bullet.

| | | | |
|---|---|---|---|
| Ballistics Coefficient(BC) | 0.12 | BC Type Bullet Weight | G7 55 |
| Caliber | 0.224 | Muzzle Velocity | 3050 |
| Bullet Length | 1 | | |
| Zero distance | 50 | Twist Direction | right |
| Scope Height | 2.5 | | |
| Longitude | -89.71921320000001 | Latitude | 42.9608139 |
| Barometric Pressure | 29.77 | Altitude Density | 1103 3391 |
| Absolute Pressure | 28.6 | Altitude(DA) Humidity | 70 |
| Temperature | 82.7 | Wind Speed | 10 |
| Wind Direction | 3 | | |

TABLE 2

Drop Chart for 0.224 cal 55 grains bullet.
0.224 cal 55 grains bullet

| Range Yards | Drop 0 MOA | Drop 0 Inches | Wind MOA | Velocity Feet/Second | Time of Flight Seconds | Energy Foot lbs |
|---|---|---|---|---|---|---|
| 1 | -233.11 | -2.44 | -0.0 | 3046 | 0.001 | 1132 |
| 2 | -113.76 | -2.38 | -0.01 | 3043 | 0.002 | 1129 |
| 3 | -73.99 | -2.32 | -0.02 | 3039 | 0.003 | 1127 |
| 4 | -54.11 | -2.27 | -0.03 | 3035 | 0.004 | 1124 |
| 5 | -42.19 | -2.21 | -0.04 | 3031 | 0.005 | 1121 |
| 6 | -34.25 | -2.15 | -0.05 | 3028 | 0.006 | 1118 |
| 7 | -28.58 | -2.10 | -0.06 | 3024 | 0.007 | 1116 |
| 8 | -24.34 | -2.04 | -0.07 | 3020 | 0.008 | 1113 |
| 9 | -21.04 | -1.98 | -0.08 | 3017 | 0.009 | 1110 |
| 10 | -18.40 | -1.93 | -0.09 | 3013 | 0.010 | 1108 |
| 25 | -4.33 | -1.13 | -0.25 | 2958 | 0.025 | 1067 |
| 50 | 0.00 | 0.00 | -0.51 | 2867 | 0.051 | 1003 |
| 55 | 0.34 | 0.20 | -0.56 | 2849 | 0.056 | 990 |
| 100 | 1.42 | 1.49 | -1.06 | 2689 | 0.105 | 882 |
| 150 | 1.14 | 1.79 | -1.65 | 2517 | 0.162 | 773 |
| 180 | 0.69 | 1.31 | -2.03 | 2417 | 0.199 | 713 |
| 200 | 0.33 | 0.69 | -2.28 | 2352 | 0.224 | 675 |
| 250 | -0.79 | -2.06 | -2.96 | 2193 | 0.290 | 587 |
| 300 | -2.14 | -6.72 | -3.68 | 2041 | 0.361 | 508 |
| 350 | -3.71 | -13.61 | -4.45 | 1895 | 0.437 | 438 |
| 450 | -7.55 | -35.57 | -6.18 | 1618 | 0.608 | 320 |
| 500 | -9.82 | -51.43 | -7.16 | 1488 | 0.705 | 270 |
| 550 | -12.35 | -71.12 | -8.22 | 1362 | 0.810 | 226 |
| 600 | -15.13 | -95.04 | -9.39 | 1241 | 0.925 | 188 |
| 650 | -18.17 | -123.67 | -10.67 | 1129 | 1.052 | 155 |
| 700 | -21.88 | -160.38 | -12.04 | 1055 | 1.190 | 136 |
| 750 | -26.32 | -206.73 | -13.38 | 1014 | 1.335 | 126 |

The disclosure is further described by the following non-limiting paragraphs:

1. A reticle comprising a circle with a gap in each quadrant of the circle, a first aiming point in the inner portion of the circle, and a second aiming point located at the bottom of the circle.
2. A reticle comprising a circle having a top portion, a left portion, a right portion, and a bottom portion, wherein the bottom portion is an aiming point, wherein the circle has a first gap located between the right portion and the top portion, a second gap located between the top portion and left portion, a third gap located between the left portion and the bottom portion, and a fourth gap located between the bottom portion and the right portion.
3. The reticle of any of the above paragraphs further comprising a horizontal line extending outward from a right portion of the circle.
4. The reticle of any of the above paragraphs wherein the horizontal line is aligned with a center field of view.
5. The reticle of any of the above paragraphs further comprising a horizontal line extending outward from a left portion of the circle.
6. The reticle of any of the above paragraphs further comprising a horizontal line extending outward from the right and left portions of the circle, wherein the horizontal line does not extend into the inner portion of the circle.
7. The reticle of any of the above paragraphs, wherein the horizontal line is aligned with the center field of view.
8. The reticle of any of the above paragraphs, wherein a top portion of the circle has a vertical line extending outward from the circle.
9. The reticle of any of the above paragraphs, wherein the vertical line does not extend into the inner portion of the circle.
10. The reticle of any of the above paragraphs, wherein the vertical line is aligned with the center field of view.
11. The reticle of any of the above paragraphs, wherein a bottom portion of the circle lacks a vertical line.
12. The reticle of any of the above paragraphs, wherein the aiming point is selected from the group consisting of: a triangle, a circle, a square, a rectangle, a star, a hexagon, an octagon, a letter and a number.
13. A reticle comprising a circle with a gap in each quadrant of the circle, a first aiming point in the inner portion of the circle, and a second aiming point located at the bottom of the circle, wherein at least two gaps are of equal length.
14. A reticle comprising a circle having a top portion, a left portion, a right portion, and a bottom portion, wherein the bottom portion is an aiming point, wherein the circle has a first gap located between the right portion and the top portion, a second gap located between the top portion and left portion, a third gap located between the left portion and the bottom portion, and a fourth gap located between the bottom portion and the right portion, wherein at least two of the four gaps are of equal length.
15. The reticle of any of the above paragraphs, wherein the first gap and the second gap are of equal length.
16. The reticle of any of the above paragraphs, wherein the third gap and the fourth gap are of equal length.
17. A reticle comprising a circle with a gap in quadrant 1, quadrant 2, quadrant 3, and quadrant 4 of the circle, a first aiming point in the inner portion of the circle, a second aiming point located at the bottom of the circle, and a horizontal line extending outward from a right and a left portion of the circle, wherein the horizontal line does not extend to the inner portion of the circle.
18. The reticle of any of the above paragraphs, wherein a top portion of the circle has a vertical line extending outward from the circle, and wherein the vertical line does not extend into the inner portion of the circle.
19. The reticle of any of the above paragraphs, wherein the gap in quadrants 1 and 2 is of equal length and the gap in quadrants 3 and 4 is of equal length.
20. An optical sight comprising the reticle of any of the above paragraphs.

21. A holographic sight comprising the reticle of any of the above paragraphs.

22. A firearm comprising the reticle of any of the above paragraphs.

23. An optical sighting device comprising a reticle pattern on a medium, wherein the reticle pattern is a circle with gaps in each of the four quadrants of the circle and a marker at the bottom of the circle.

24. An optical sighting device comprising a reticle pattern on a medium comprising a circle with gaps in each of the four quadrants of the circle, a marker at the bottom of the circle, and a bulls-eye in the center of the circle.

25. An optical sighting device comprising a reticle pattern on a medium comprising a 65 MOA outer circle with gaps in each of the four quadrants of the circle, a marker at the bottom of the circle, and a bulls-eye in the center of the circle.

26. An optical sighting device comprising a focal plane, a reticle positioned in the focal plane, wherein the reticle is a circle with gaps in each of the four quadrants of the circle and a marker at the bottom of the circle.

27. An optical sighting device comprising a focal plane, a reticle positioned in the focal plane, wherein the reticle is a circle with gaps in each of the four quadrants of the circle, a marker at the bottom of the circle, and a bulls-eye in the center of the circle.

28. An optical sighting device comprising a focal plane, a reticle positioned in the focal plane, wherein the reticle is a 65 MOA outer circle with gaps in each of the four quadrants of the circle, a marker at the bottom of the circle, and a bulls-eye in the center of the circle.

29. An optical device comprising a focal plane, a reticle positioned in the focal plane, wherein the reticle is a circle with a gap in at least one quadrant of the circle and multiple aiming points.

30. A firearm comprising a reticle of any of the above paragraphs.

31. An optical sight comprising a reticle of any one of the above paragraphs.

32. A holographic sight comprising a reticle of any one of the above paragraphs.

It is to be understood that while the reticles, optical sights, holographic sights, target acquisition devices, firearms, and methods have been described in conjunction with the detailed description thereof, the foregoing description is intended to illustrate and not limit the scope of the disclosure, which is defined by the scope of the appended claims. Other aspects, advantages, and modifications are within the scope of the following claims.

What is claimed is:

1. A reticle comprising a top portion with a vertical line extending outward, a left portion, a right portion with a horizontal line extending outward, and a bottom portion, wherein the bottom portion is an aiming point, and wherein a first gap is located between the right portion and the top portion, a second gap is located between the top portion and left portion, a third gap is located between the left portion and the bottom portion, and a fourth gap is located between the bottom portion and the right portion, and further wherein the aiming point is selected from the group consisting of: a triangle, a circle, a square, a rectangle, a star, a hexagon, an octagon, a letter and a number.

2. The reticle of claim 1 a wherein the horizontal line is aligned with a center field of view.

3. The reticle of claim 1 further comprising a second horizontal line extending outward from the left portion.

4. The reticle of claim 1, wherein the vertical line is aligned with a center field of view.

5. A reticle comprising a top portion, a left portion with a first horizontal line extending outward, a right portion with a second horizontal line extending outward, and a bottom portion, wherein the bottom portion is an aiming point, wherein a first gap is located between the right portion and the top portion, a second gap is located between the top portion and left portion, a third gap is located between the left portion and the bottom portion, and a fourth gap is located between the bottom portion and the right portion, wherein at least two of the four gaps are of equal length.

6. The reticle of claim 5, wherein the first gap and the second gap are of equal length.

7. The reticle of claim 5, wherein the third gap and the fourth gap are of equal length.

8. A reticle comprising a circle with a gap in quadrant 1, quadrant 2, quadrant 3, and quadrant 4 of the circle, a first aiming point in an inner portion of the circle, a second aiming point as a bottom portion of the circle, a right portion with a first horizontal line extending outward of the circle and a left portion with a second horizontal line extending outward of the circle, wherein the first and second horizontal lines do not extend to the inner portion of the circle.

9. The reticle of claim 8, wherein a top portion of the circle has a vertical line extending outward from the circle, and wherein the vertical line does not extend into the inner portion of the circle.

10. The reticle of claim 9, wherein the gap in quadrants 1 and 2 is of equal length and the gap in quadrants 3 and 4 is of equal length.

11. An optical sight comprising the reticle of claim 10.

12. A holographic sight comprising the reticle of claim 8.

13. An optical sight comprising the reticle of claim 1.

* * * * *